United States Patent

[11] 3,598,032

| [72] | Inventors | Stanley W. Bohn<br>Bethel Park;<br>William J. Dimond, Allison Park, both of, Pa. |
|---|---|---|
| [21] | Appl. No. | 876,933 |
| [22] | Filed | Nov. 14, 1969 |
| [45] | Patented | Aug. 10, 1971 |
| [73] | Assignee | The United States of America as represented by the United States Atomic Energy Commission |

[54] PRODUCING STEREOPHOTOGRAPHS WITH A CLOSED CIRCUIT TELEVISION SYSTEM
2 Claims, 1 Drawing Fig.

[52] U.S. Cl. ................................................. 95/18 P, 178/6.5
[51] Int. Cl. ........................................... G03b 35/08
[50] Field of Search ........................................ 95/18 P; 178/6.5

[56] References Cited
UNITED STATES PATENTS

| 2,165,028 | 7/1939 | Blumlein | 178/7.5 |
| 3,037,441 | 6/1962 | Leach | 95/18 P X |

*Primary Examiner*—Samuel S. Matthews
*Assistant Examiner*—Richard M. Sheer
*Attorney*—Roland A. Anderson

ABSTRACT: A method of producing a three-dimensional stereo effect. A television camera is moved in an arc about the objects to be photographed. The images appearing on a television monitor are photographed at each of two camera positions. Stereophotographs are produced from the monitor images by use of an offset contact-printing technique. The two resultant stereophotographs are examined simultaneously through a stereoviewer.

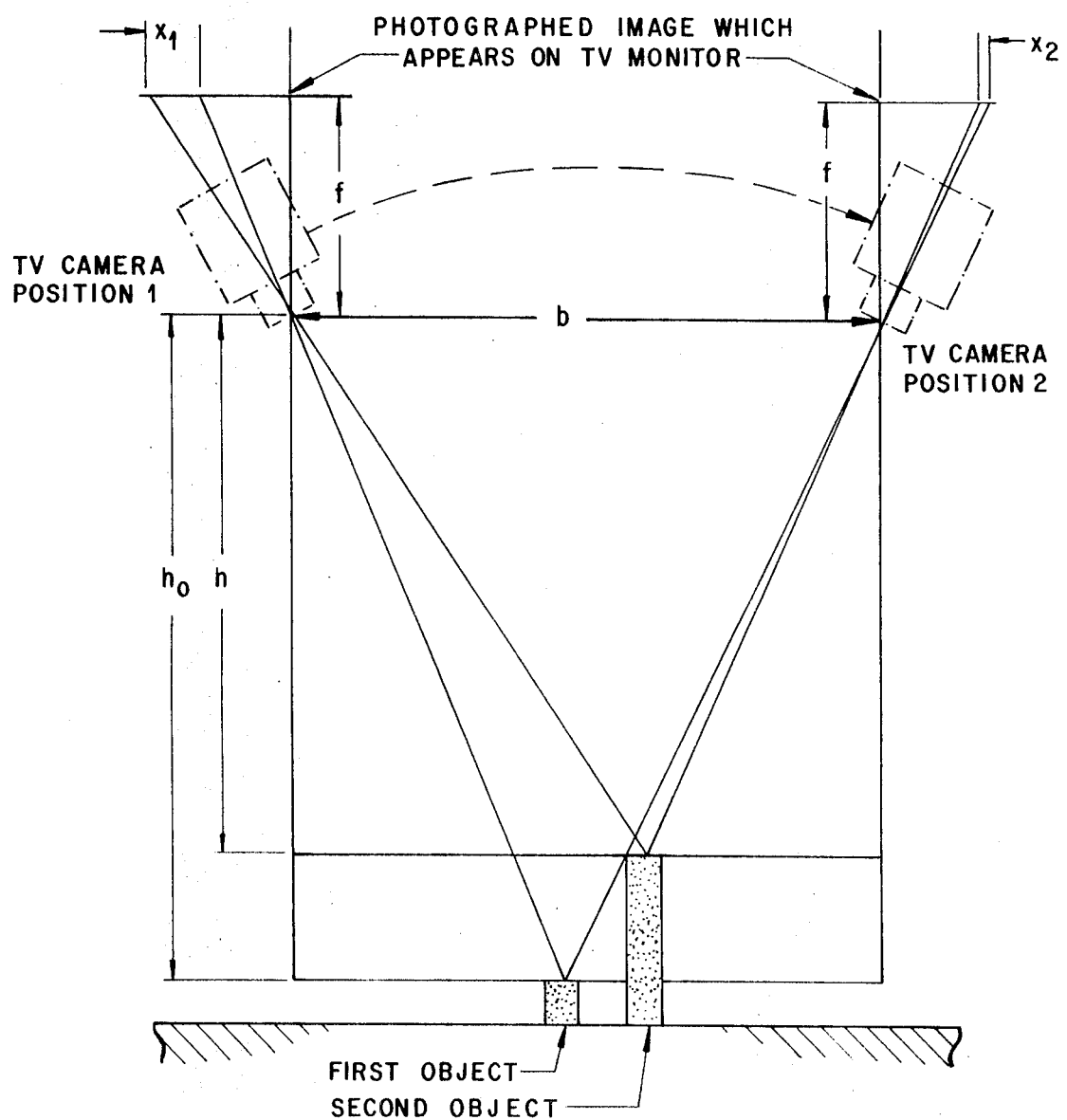

PRODUCING STEREOPHOTOGRAPHS WITH A CLOSED CIRCUIT TELEVISION SYSTEM

BACKGROUND OF THE INVENTION

This invention was made in the course of, or under, a contract with the United States Atomic Energy Commission.

Stereophotographic techniques have been widely employed in measuring the contours of the earth's surface from stereo pairs of aerial photographs. These techniques are also of use in providing a permanent record of the surface contours of small objects. Stereophotography is an especially useful technique for measuring the surface contours of small irradiation specimens to a high degree of precision.

At present, stereophotographs of irradiation specimens are taken by use of a stereomicroscope, which is semipermanently mounted in a port through a wall of a hot cell. The microscope is subject to misalignment when moved or disturbed. Overhauls, when needed, may cost as much as one-half of the original purchase price of the equipment. Another disadvantage of use of a stereomicroscope is evident: only a limited number of magnifications are available.

Use of a closed circuit television system in that it is easily moved to new locations, does not require an open port through a hot cell wall, and is capable of an almost infinite number of magnifications. Further, all major components of the television system, with the exception of the camera, may be located outside the hot cell wall for ease of maintenance. Heretofore, the principal problem associated with use of a television system has been the fact that stereophotographs made from television monitors contain horizontal scan lines. These lines appear as a plane above the true stereo image when projected by a Kelsh Plotter and make height measurements difficult. The visual confusion caused by the scan lines, which appear as voids, disrupts the eye's stereoscopic accommodation and destroys the stereoscopic image.

SUMMARY OF THE INVENTION

Accordingly, it is an object of the present invention to provide a method for reducing the deleterious effect of scan lines appearing in stereophotographs made from television monitors.

It is another object of this invention to enhance the resolution of stereophotographs.

It is a further object of this invention to utilize an offset method in the production of stereophotographs.

A final object of this invention is to provide a technique for taking stereophotographs with a single TV camera and monitor.

To accomplish the above objects, a television camera is moved in an arc about the objects to be photographed, the resultant images appearing on a television monitor. The television monitor screen is photographed at each of two TV camera positions. Two transparent stereo positives are made from each of the two stereo negatives (i.e., the negatives of the photograph of the TV monitor screen). The two stereo positives are overlaid on each other, offset the width of one scan line, and rephotographed. Use of this offset method has the desirable result of filling in voids caused by the scan lines with display data from the adjoining scan lines. Each resulting stereo negative is contact printed on a glass plate by use of a Log-E-Tronic (trade name) Printer. The glass plates are mounted on a Kelsh Plotter (commercially available aerial mapping equipment) for dimensional interpretation. The Kelsh Plotter magnifies and projects the stereo image on a movable stage. The stage is calibrated to read the relative heights of the elevations within the stereo image.

DESCRIPTION OF PREFERRED EMBODIMENT

The novel features of the present invention, as well as additional objects and advantages thereof, will be more readily understood from the following description, when read in connection with the accompanying drawing.

A three-dimensional stereo effect is obtained by use of the technique illustrated in the drawing when two objects are photographed at different distances from the camera. The stereo effect is caused by parallax ($\Delta p$) represented by $x_1-x_2$ on the drawing.

If stereophotographs are taken of two objects whose top surfaces are at different heights from some reference plane, the difference in height will be recorded as parallax on the stereo pairs. With reference to the drawing, the relationship between differences in height and parallax can be expressed in an equation for any given optical system as defined by $f$ (focal distance), and $h$ (object-to-lens distance), and $b$ (separation of the two focal spots in the stereophotographic setup). The equation is stated in the following manner:

$$\Delta h = h_o \Delta p / bf$$

For derivation of this relationship, see Solomon, Y.; Bohn, S.W. and Dimond, W. J., Development of Photogrammetric Techniques for Measuring Surface Contours of Small Samples, Proceedings of the 14th Conference on Remote Systems Technology, Pittsburgh, Pa.

In the preferred method of our invention, the television camera is moved in a 20° arc (10° each side of the center line) and the resulting images, which appear on the television monitor, are photographed at each of the two camera positions. We have successfully photographed the TV monitor screen with an 8 × 10 photographic camera. Two transparent stereo positives are made from each of the two resultant stereo negatives. The two stereo positives are overlaid on each other, offset the width of one television scan line (our present TV system, which is capable of 800 line resolution, has about 30 scan lines to the inch when photographed on a one-to-one basis), and rephotographed. The resulting negatives are contact printed on glass plates by use of a Log-E-Tronic Printer. The glass plates are then mounted on a Kelsh Plotter for dimensional interpretation.

What we claim is:

1. A method of producing a stereophotograph with a closed circuit television system, comprising:
    a. photographing an image of the object appearing on the television monitor to produce a negative of the monitor image at each of two positions of the television camera producing such image;
    b. producing a positive from each of said negatives;
    c. overlaying said positives in a position wherein the positives are offset by the width of one television scan line;
    d. photographing the overlaid positives to produce a stereo negative; and
    e. printing the stereo negative.

2. The method of claim 1, wherein the stereo negative is contact printed.